No. 767,420. PATENTED AUG. 16, 1904.
M. F. McLOUGHLIN.
RAKE.
APPLICATION FILED OCT. 1, 1903.
NO MODEL.
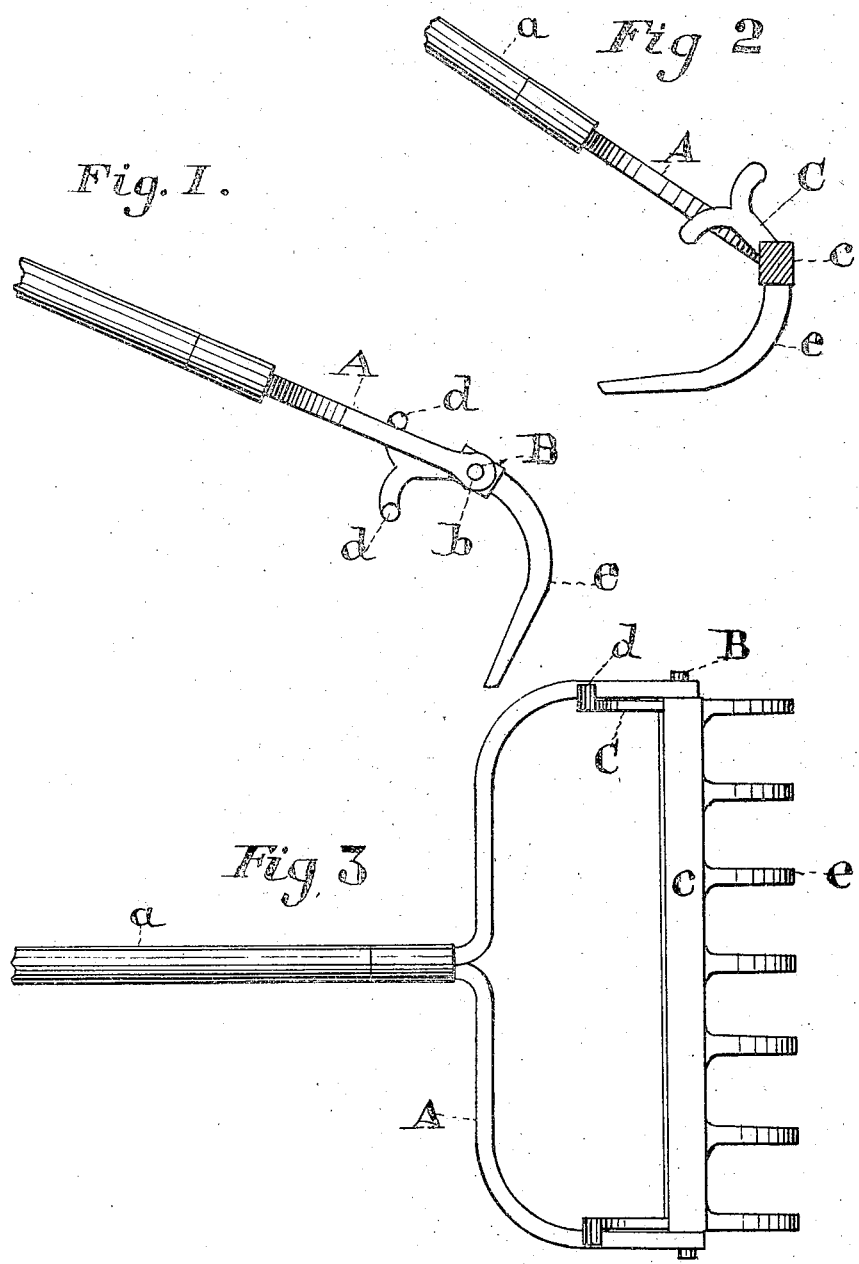

No. 767,420. Patented August 16, 1904.

UNITED STATES PATENT OFFICE.

MAURICE F. McLOUGHLIN, OF KALAMAZOO, MICHIGAN.

RAKE.

SPECIFICATION forming part of Letters Patent No. 767,420, dated August 16, 1904.

Application filed October 1, 1903. Serial No. 175,321. (No model.)

*To all whom it may concern:*

Be it known that I, MAURICE F. McLOUGHLIN, a citizen of the United States, residing at Kalamazoo, in the county of Kalamazoo and State of Michigan, have invented new and useful Improvements in Rakes, of which the following is a specification.

My invention relates to improvements in rakes in which the rake-head pivotally connects with a side bar projecting from the handle; and the object of my improvement is to provide a cheap and effective device to clear the rake-teeth from grass and weeds entangled therein when in use, thus obviating the necessity of removal by hand.

I attain these objects by the mechanism illustrated in the accompanying drawings, forming a part of this specification, in which—

Figure 1 is a side elevation of a rake with my device thereon. Fig. 2 is a sectional view of the opposite end of the rake. Fig. 3 is a plan view of the rake.

Similar letters refer to similar parts throughout all the views.

A represents side bars projecting from the rake-handle $a$ and provided at their outer ends with circular openings $b$, which engage pivots B, extending from the ends of the rake-head $c$, thus forming a brace, keeping the rake in position and also a frame wherein it is pivoted. Any arrangement of the pivots B and the openings $b$ on the rake-head and side bars adapted to permit rotary motion to said rake-head is an equivalent to this device.

C represents rods extending backward from the ends of the rake-head $c$, each consisting of two members and provided at their outer ends with check-stops $d$, adapted to engage the side bars A.

When the rake is used, it is pulled toward the operator and kept in position by contact of the upper stops $d$ with the side bars A. When the teeth are filled up and clogged with grass, leaves, or weeds, the handle $a$ is pushed backward, causing the rake to turn up until held by the lower stops $d$ striking the under side of the side bars A. The rake-teeth $e$ are then about parallel with the surface of the ground and are readily cleared by their backward friction thereon.

Having described my invention, I claim—

In a rake the combination of a handle having a frame pivotally attached to the outer ends of a rake-head provided with teeth, with fixed undetachable rods secured to said rake-head and having stops at their outer ends to regulate the rotation of the rake-head by contact with the frame, substantially as and for the purpose set forth.

MAURICE F. McLOUGHLIN.

Witnesses:
HENRY C. GARRETT,
JACOB FRAZELLE.